United States Patent Office 3,210,290
Patented Oct. 5, 1965

3,210,290
THALLIUM-ACTIVATED ZINC SULFIDE
PHOSPHOR
Anselm Wachtel, Sayreville Township, Middlesex County, N.J., assignor to Westinghouse Electric Corporation, East Pittsburgh, Pa., a corporation of Pennsylvania
No Drawing. Filed Aug. 17, 1962, Ser. No. 217,541
2 Claims. (Cl. 252—301.6)

This invention relates to phosphors and, more particularly, to improve phosphors which are both photoluminescent and electroluminescent, in addition to having an infrared-stimulated emission.

Only relatively few electroluminescent phosphors are known to have a long wavelength visible emission, and these known phosphors have certain technical disadvantages which limit their use. Phosphors which are stimulated by ultraviolet excitation to emit in the longer wavelength regions of the visible spectrum are useful in discharge devices and cathode-ray tube applications, for example. There are also applications for phosphors which are stimulated by infrared radiation, in order to generate a long wavelength visible output.

It is the general object of the present invention to provide an improved photoluminescent phosphor material which can be made to emit in the yellow or the deep red regions of the visible spectrum, depending upon the activators.

It is another object to provide an electroluminescent phosphor which has a long wavelength visible emission.

It is a further object to provide a phosphor which is stimulated by infrared radiation to emit in the longer wavelength regions of the visible spectrum.

It is an additional object to provide methods for making phosphors which are both electroluminescent and photoluminescent, as well as excitable by infrared radiations, to emit in the longer wavelength regions of the visible spectrum.

The aforesaid objects of the invention, and other objects which will become apparent as the description proceeds, are achieved by providing a phosphor composition having a matrix principally comprising zinc sulfide and activated either by thallium or by thallium plus copper. Activator ranges are provided and the emission of the phosphor depends upon the activators used. In preparing the phosphor, it is preferred first to introduce the thallium activator in compound form and then to fire the phosphor raw mix in a sealed container, in order to prevent volatilization of the thallium during the firing process.

The phosphor matrix or host crystal principally comprises zinc sulfide. It should be understood that small amounts of other Group IIB metals, such a cadmium and mercury, can be substituted in part for the zinc, and a small amount of selenium can be substituted for a part of the sulfur in the phosphor matrix. The primary activator material is thallium which is present in the phosphor in amount of from $2 \times 10^{-5}$ to $2 \times 10^{-3}$ gram atom of thallium per gram mole of zinc sulfide matrix. The thallium activator can be supplemented by a copper activator, which is included in the raw mix in compound form in amount of from $1 \times 10^{-4}$ to $1 \times 10^{-2}$ gram atom of copper per gram mole of the zinc sulfide matrix which is formed during firing.

As a specific example for preparing the copper- and thallium-activated phosphor embodiment, 170 grams of zinc sulfide is slurried with a solution containing 0.35 gram of copper acetate. This solution is dried and mixed with 0.385 gram of thallium sulfide and 5 grams of elemental sulfur. The mix is fired in a capped silica tube having a nitrogen atmosphere at a temperature of 950° C. for a period of one hour. Thereafter, the resulting phosphor is washed with an aqueous sodium cyanide solution, such as a 10% by weight solution, as is usual with electroluminescent prosphors. The concentration of this washing solution can be varied. The phosphor is then desirably washed with a 1% aqueous solution of hydrogen peroxide dissolved in a dilute solution of ammonium hydroxide, in order to remove any excess thallium sulfide from the surface of the phosphor particles. The finished phosphor exhibits an orange-red electroluminescence.

The best electroluminescent phosphors of the present invention are prepared by first firing zinc sulfide with $1 \times 10^{-3}$ gram atom of copper per gram mole of sulfide, with the copper added as the acetate. The mix is first fired in a hydrogen sulfide atmosphere at a temperature of 950° C. for a period of one hour. Thereafter, the first fired material is mixed with $2 \times 10^{-4}$ gram atom of thallium per gram mole of the zinc sulfide, added as thallium sulfide, and a small amount of sulfur is also added in order to provide a sulfurizing atmosphere. The mixed material is placed into an evacuated, sealed, silica tube and fired at a temperature of 950° C. for a period of one hour. The effect of the sealed tube is to prevent volatilization of the thallium activator during the firing procedure. After firing, the phosphor is treated by washing, as in the previous example.

The copper- and thallium-activated phosphor can be both electroluminescent and photoluminescent, and in order to achieve any appreciable amount of electroluminescence from the phosphor, there should be at least $5 \times 10^{-4}$ gram atom of copper added to the raw mix per gram mole of zinc sulfide matrix which is formed during the firing. The best electroluminescent performance is obtained when copper is added to the raw mix in amount of $1 \times 10^{-3}$ gram atom per gram mole of zinc sulfide and thallium is present in the phosphor in amount of $2 \times 10^{-4}$ gram atom per gram mole of zinc sulfide matrix.

In preparing the phosphor embodiment which is activated only by thallium, the foregoing procedures are repeated, except that the copper compound is not added to the raw mix. As an example, one gram mole of zinc sulfide is evenly mixed with $2 \times 10^{-4}$ gram atom of thallium added as thallium sulfide, together with a small amount of elemental sulfur. A portion of this mix is placed into a silica tube, which is evacuated and sealed. The tube is then fired at a temperature of 950° C. for a period of one hour. This phosphor embodiment is responsive to excitation by ultraviolet radiations to emit in the yellow and is also stimulated by infrared radiations to emit in the yellow. When only a thallium activator is used, the phosphor is not electroluminescent. The yellow photoluminescent response of the phosphor embodiment which is activated only by thallium is also very good at relatively high temperatures, such as 500° K.

Firing in a sealed tube in the manner described hereinbefore is generally outlined in U.S. Patent No. 3,039,972, dated June 19, 1962. In preparing the copper- and thallium-activated phosphor of the present invention, the temperature of the initial firing step, wherein the copper is introduced into the phosphor, can be varied from 700° C. to 1200° C. and the firing time should be at least one-half hour. When the thallium compound is introduced into this first-fired material, and the resulting mix is fired in a sealed, evacuated container, the firing temperature can be varied from 700° C. to 1200° C. and the firing time should be at least one-half hour. The firing temperature can be similarly varied when preparing the present phosphor embodiment which is activated only by thallium. Of course the material which is sealed in the evacuated container and then fired should be free from any compound which forms gaseous products of decomposition on heating, in order to avoid possible rupture of the firing container.

The photoluminescent response of the copper- and thallium-activated phosphor depends upon whether the copper activator is used. With no copper activator, the photoluminescent emission appears yellow, but when copper activator is present, the emission shifts toward the longer visible wavelengths, since the copper activator adds a red emission band.

The present phosphors are readily stimulated by infrared radiations in order to emit a flash of light in the longer wavelength regions of the visible spectrum. As an example, the phosphor is first irradiated with 3650 A.U. excitation and thereafter irradiated with infrared. With only a thallium activator, there is emitted a very strong yellow flash of light. With the addition of copper activator, the infrared-stimulated emission shifts toward even longer visible wavelengths. The addition of relatively large amounts of copper activator causes the infrared-stimulated emission to occur as a brief flash.

It is important that the present phosphor contains substantially no halogen or Group IIIA element other than thallium, since these known coactivating materials will override the effect of the thallium emission. Thus when preparing the phosphor, it is important that the raw mix should be substantially free from halogen-containing compound or Group IIIA element-containing compound, other than the indicated thallium.

It will be recognized that the objects of the invention have been achieved by providing photoluminescent and electroluminescent phosphor material which emits in the longer wavelength regions of the visible spectrum. The phosphor is also stimulated by infrared radiations in order to generate a long wavelength emission. There have also been provided methods for preparing such phosphor.

While best examples have been illustrated and described in detail, it is to be particularly understood that the invention is not limited thereto or thereby.

I claim as my invention:

1. A phosphor composition having a zinc sulfide matrix and activated by thallium, and substantially free from any halogen and any Group IIIA element other than thallium, and thallium present in said phosphor in amount of from $2 \times 10^{-5}$ to $2 \times 10^{-3}$ gram atom per gram mole of zinc sulfide.

2. A phosphor composition having a zinc sulfide matrix and activated by thallium, and substantially free from any halogen and Group IIIA metal other than thallium, and thallium present in said phosphor in amount of about $2 \times 10^{-4}$ gram atom per gram mole of zinc sulfide.

References Cited by the Examiner

UNITED STATES PATENTS 2,447,322   8/48   Fonda _____ 252—301.6

FOREIGN PATENTS 201,462   4/56   Australia.

TOBIAS E. LEVOW, *Primary Examiner.*

MAURICE A. BRINDISI, *Examiner.*